United States Patent [19]
Mössner et al.

[11] Patent Number: 6,125,454
[45] Date of Patent: Sep. 26, 2000

[54] METHOD FOR RELIABLY TRANSMITTING INFORMATION ON A BUS

[75] Inventors: Rudolf Mössner; Roland Lotter, both of Schwandorf; Jürgen Maul, Sulzbach-Rosenberg, all of Germany

[73] Assignee: Siemens Aktiengesellschaft, Munich, Germany

[21] Appl. No.: 08/241,437

[22] Filed: May 11, 1994

[30] Foreign Application Priority Data

May 14, 1993 [EP] European Pat. Off. .............. 93107889

[51] Int. Cl.⁷ ....................................................... H02H 3/05
[52] U.S. Cl. .............................. 714/4; 714/748; 714/821; 714/712
[58] Field of Search ................................. 395/575; 371/32, 371/33, 30, 49.1, 48, 68.2; 364/265.1, 266.3; 714/4, 800, 712, 748, 749, 821, 799

[56] References Cited

U.S. PATENT DOCUMENTS

| | | | |
|---|---|---|---|
| 3,249,917 | 5/1966 | Yagusic | 340/146 |
| 3,283,302 | 11/1966 | Brass | 340/146 |
| 3,997,879 | 12/1976 | Markley et al. | 340/172 |
| 4,352,103 | 9/1982 | Slater | 371/33 |
| 4,642,630 | 2/1987 | Beckner et al. | 340/825.5 |
| 4,843,633 | 6/1989 | Menich et al. | |
| 4,914,654 | 4/1990 | Matsuda et al. | 371/33 |
| 4,941,083 | 7/1990 | Gillett et al. | 364/200 |
| 4,959,833 | 9/1990 | Mercola et al. | 371/32 |
| 5,031,179 | 7/1991 | Yoshida et al. | 371/32 |
| 5,077,656 | 12/1991 | Waldron et al. | 395/325 |
| 5,163,137 | 11/1992 | Yamamoto et al. | 395/325 |
| 5,173,905 | 12/1992 | Parkinson et al. | 371/40.1 |
| 5,365,551 | 11/1994 | Snodgrass et al. | 375/1 |

FOREIGN PATENT DOCUMENTS

| | | |
|---|---|---|
| 0 155 403 | 4/1988 | European Pat. Off. . |
| 26 40 756 | 3/1978 | Germany . |
| 32 05 217 | 6/1983 | Germany . |
| 36 05 359 | 8/1987 | Germany . |
| WO82/03710 | 10/1982 | WIPO . |

Primary Examiner—Phung M. Chung
Attorney, Agent, or Firm—Kenyon & Kenyon

[57] ABSTRACT

The present invention relates to an improved method for transmitting information on a bus assigned to an electrical controller including a main unit and at least one secondary unit. According to the invention, the reliability of data transmission via the bus is enhanced by checking each data transmission for errors. When a faulty data transmission is found, the data transmission is repeated. An error message will not be generated until a faulty data transmission is detected for a predetermined number of successive transmissions.

13 Claims, 6 Drawing Sheets

METHOD FOR RELIABLY TRANSMITTING
INFORMATION ON A BUS

BACKGROUND OF THE INVENTION

The present invention relates to data communications, and in particular to a method for transmitting data on a bus connecting a main unit of an electrical controller to at least one secondary unit.

Data transmission methods of the type to which the present invention is directed are commonly used for modular programmable controllers. Depending on the controller, a suitable bus may be designed as either a serial bus or a parallel bus. An example of a programmable controller with a serial bus is the "SIEMENS" programmable controller "SIMATIC S5-100 U"; and an example of a programmable controller with a parallel bus is the programmable controller "SIMATIC S5-115 U".

Industrial systems and processes are often controlled by programmable controllers. Transmission errors occurring between the main unit and a secondary unit of such a controller can lead to faulty system or process control, which can cause damage to material and/or injury to persons. Therefore, reliable data transmission between the main unit and its secondary units is absolutely essential, even under the harsh conditions of an industrial operation.

Known approaches to data transmission in industrial systems have used increasingly more complex bus interface connections to guarantee reliable data transmission, leading to highly complex hardware and increased costs. Even with this high level of complexity, however, the transmitted information is not validated. Instead, prior art methods merely check whether a secondary unit responds within a required reaction time after having been addressed by the main unit. If a response is not timely received, an error message is generated prompting execution of a user-programmed error recovery routine. Depending on the particular error recovery routine, the programmable controller may be stopped, or the failure of the addressed secondary unit to respond may be ignored.

SUMMARY OF THE INVENTION

The present invention is directed to achieving extremely reliable data transmission between a main unit of a programmable controller and at least one secondary unit using a bus assigned to the controller, while keeping the complexity of the required hardware to a minimum. This objective is met using a method involving validity checks and retransmission when errors are encountered.

According to the present invention, data transmissions are checked for errors. When a faulty data transmission is detected, the transmission is repeated. An error message is not generated until a predetermined number of successive data transmissions are found to be faulty.

The repetitive transmission approach of the present invention allows the degree of complexity of the system hardware to be drastically reduced. For example, the complexity of the hardware used for data transmission might be reduced to a point where a statistical probability of transmission errors on the order of $10^{-4}$ is introduced into the system. Such a probability of error would be untenable for a standard bus, since it would lead to at least one faulty transmission each second. By contrast, this same error rate in a system configured according to the present invention, given a maximum of two repetitions of faulty transmissions, would merely lead to slightly greater loading. Based on the $10^{-4}$ probability of error, only one in every ten-thousand data transmissions would have to be repeated.

Industrial control systems generally transmit several types of data across a bus, such as commands and control data. Accordingly, the present invention advantageously generates error messages that are specific to the type of data sent in the faulty transmission, thereby making it possible to react more flexibly to faulty transmissions.

Data validation according to the method of the present invention preferably includes checking the transmitted data for plausibility. For example, if all transmissions consist of 8-bit groups and the controller recognizes 60 different commands, the receiver of a command can verify whether the received data corresponds to one of the defined commands. To further increase reliability, test data may be appended to the transmitted data and validated upon receipt. This test data may consist, for example, of a parity bit added to each byte of a data transmission. When a bus is designed as a serial bus in which data transmissions always consist of integral multiples of a fixed number of bits, a faulty transmission can also be detected by checking whether the number of received bits deviates from an integral multiple of the fixed number.

Other advantages and details of the present invention are revealed below in light of the exemplary embodiments with reference to the drawing figures.

DETAILED DESCRIPTION

Figure 1:
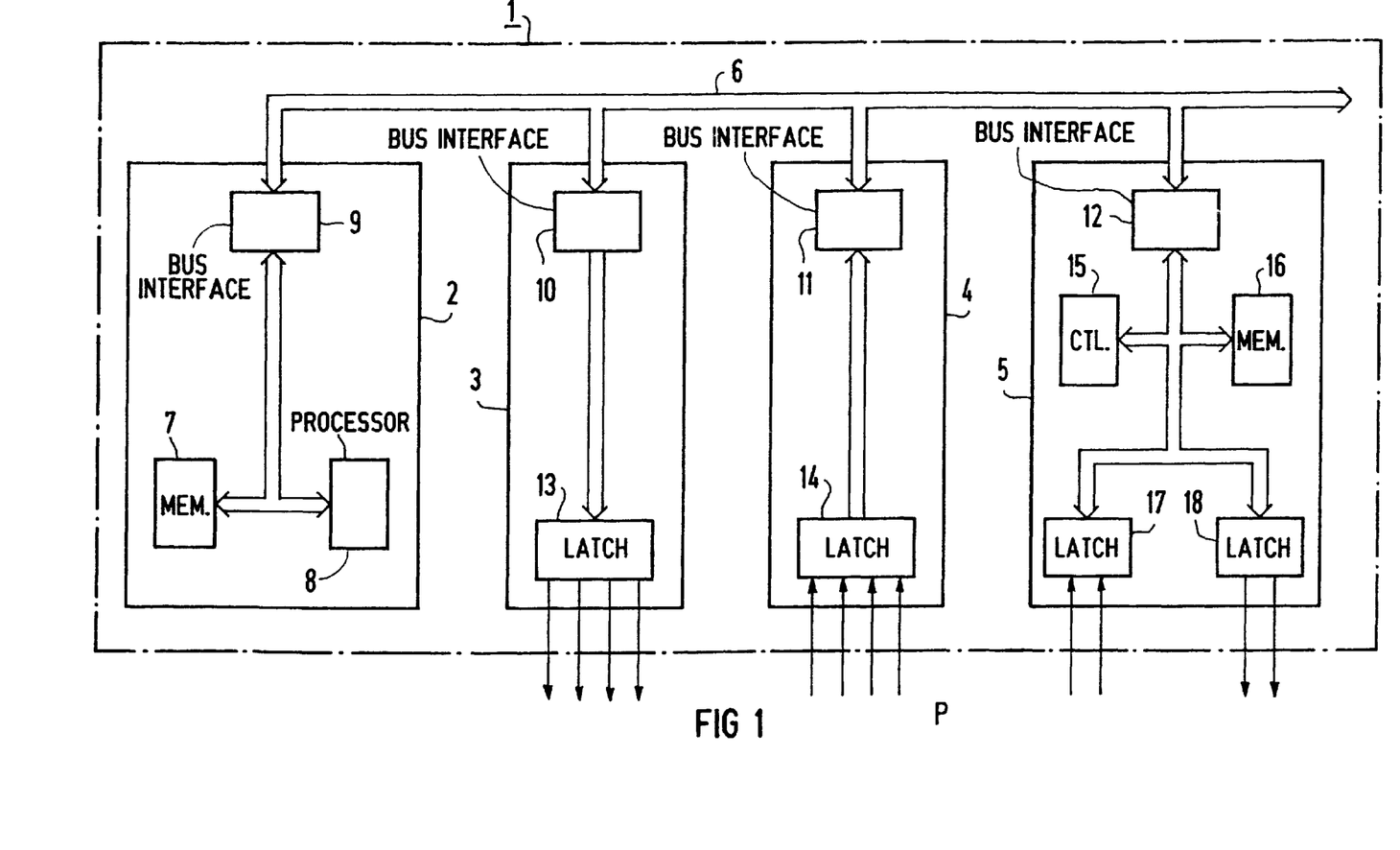
FIG. 1 is a block diagram of an embodiment of a programmable controller according to the present invention.

FIG. 1 shows an embodiment of a programmable controller 1 including a central processing unit 2 and interface modules 3–5, which are interconnected through a serial bus 6. The central processing unit 2 is the main unit of the programmable controller and includes a memory device 7 storing a control program executable by a processor 8. During execution of the control program, the processor 8 accesses the bus 6 through a bus interface connection 9. For example, the processor 8 may output a command to each of the interface modules 3–5, after which the processor 8 may output control data to or receive input data from the interface modules 3–5.

The interface modules 3–5, which represent secondary units of the programmable controller 1, also have bus interface connections 10–12. In the embodiment of FIG. 1, the interface module 3 is a digital output module capable of outputting signals through a latch 13 to final controlling elements (not shown) to manage a process P. The interface module 4 is a digital input module, which can receive signals from the process P through a latch 14 and one or more sensors (not shown). Finally, the interface module 5 is an intelligent peripheral unit including a microprocessor 15 and a memory device 16. The interface module 5 may be used to automatically control a small sub-process through latches 17, 18. The particular interface modules 3–5 are merely an exemplary selection; interface modules in other numbers and configurations could also be connected to the central processing unit 2.

The bus 6 shown in the embodiment of FIG. 1 is internal to the programmable controller 1; that is, it is arranged within a housing of the programmable controller 1. Nonetheless, the bus 6 could just as effectively be run outside of the programmable controller 1. Such a configuration would be desirable when the central processing unit 2 and the interface modules 3–5 are encapsulated modules arranged close together, but not inside a shared housing. In either case, the bus 6 is assigned to an integral system; contrary, for example, to a distributed system, in which interface modules are arranged at a distance from one another and remote from an associated central processing unit.

Figure 2:
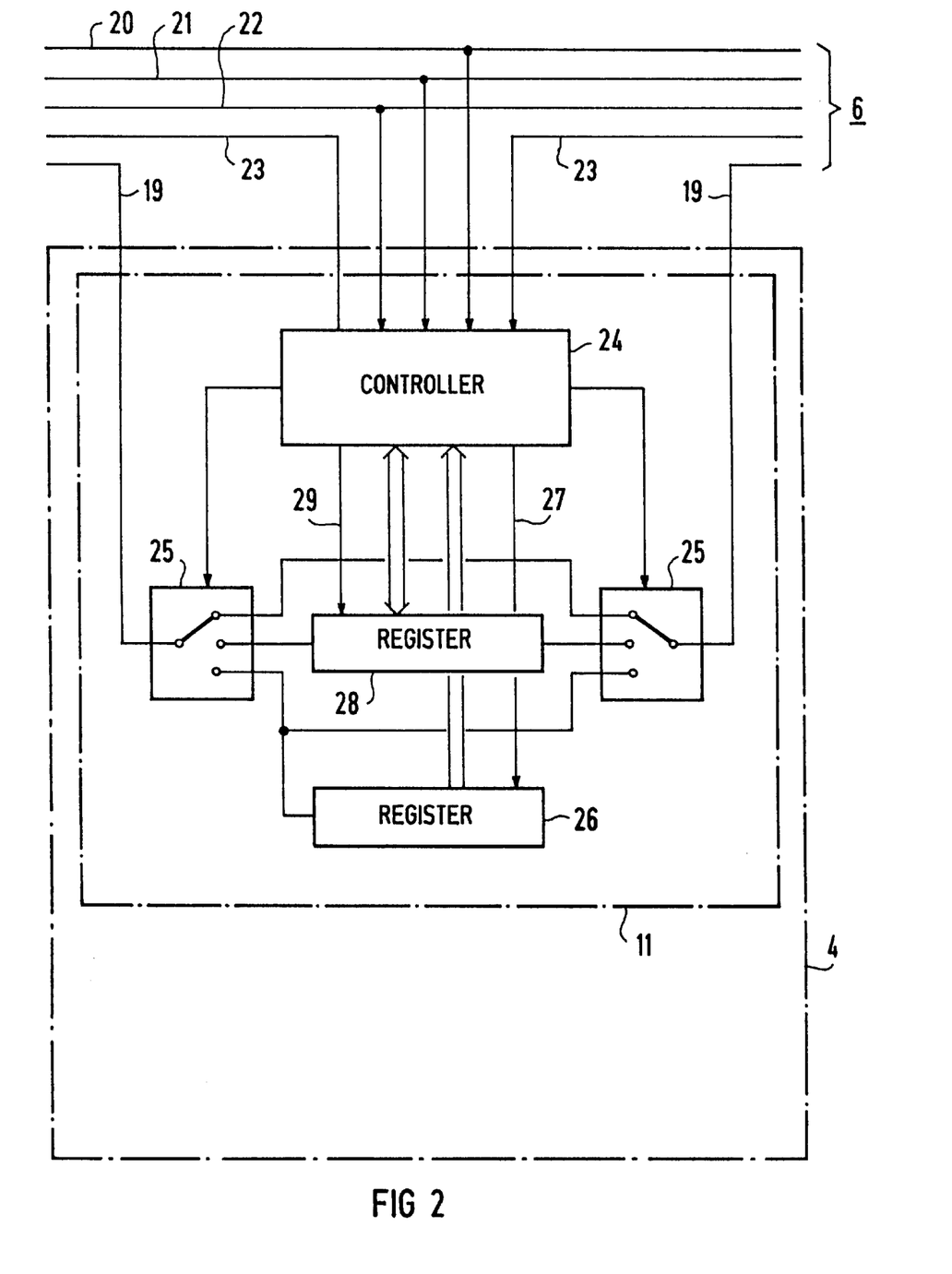
FIG. 2 is a block diagram of an embodiment of an interface module of the programmable controller of FIG. 1.

Referring to FIG. 2, the bus 6 consists of five lines: a data line 19, a timing circuit 20, a command-control line 21, a data-control line 22, and an acknowledgement circuit 23. The data line 19 is used to transmit commands and data from the central processing unit 2 to the interface modules 3–5, as well as to transmit data from the interface modules 3–5 to the central processing unit 2. The timing circuit 20 transmits a clock signal which may be used to determine the rate of a serial data transmission across the data line 19. The control lines 21, 22 are used to determine the current status of the bus. For example, if both control lines 21, 22 are carrying a high signal, then the bus 6 is in an idle state. If the command-control line 21 goes to low, this indicates the beginning of a command transition. Similarly, the data-control line 22 going to low signifies the beginning of a data transmission. Finally, the interface modules 3–5 may transmit an acceptance of commands or data through the acknowledgement circuit 23. The acknowledgment circuit 23 may also be used to indicate the end of a data transmission when data is being read from the interface modules 3–5 into the central processing unit 2.

As noted above, the bus 6 of the present embodiment is a serial bus internal to the programmable controller 1. When commands are transmitted, the bus is operated as a true serial bus in a broadcasting mode. On the other hand, when data is being transmitted the bus is operated as a shift register. This dual modality will be clarified below with reference to FIG. 3 and FIG. 4.

FIG. 2 further shows a bus interface connection 11 of the interface module 4. The bus interface connections of the other interface modules 3 and 5 have essentially the same structure. The bus interface connection 11 includes a controller 24 which manages data transmissions between the central processing unit 2 and the interface module 4 using signals fed from the timing circuit 20 and the control lines 21, 22. An acknowledgement signal from the interface module 5 is also fed to the controller 24. In the controller 24, this acknowledgement signal is suitably combined in a logic operation with the acknowledgement signal from the interface module 4 itself, and the combined signal is then transmitted to the interface module 3. The interface module 3 similarly adds its own acknowledgment signal to the combined signal and transmits it to the central processing unit 2.

Figure 3:
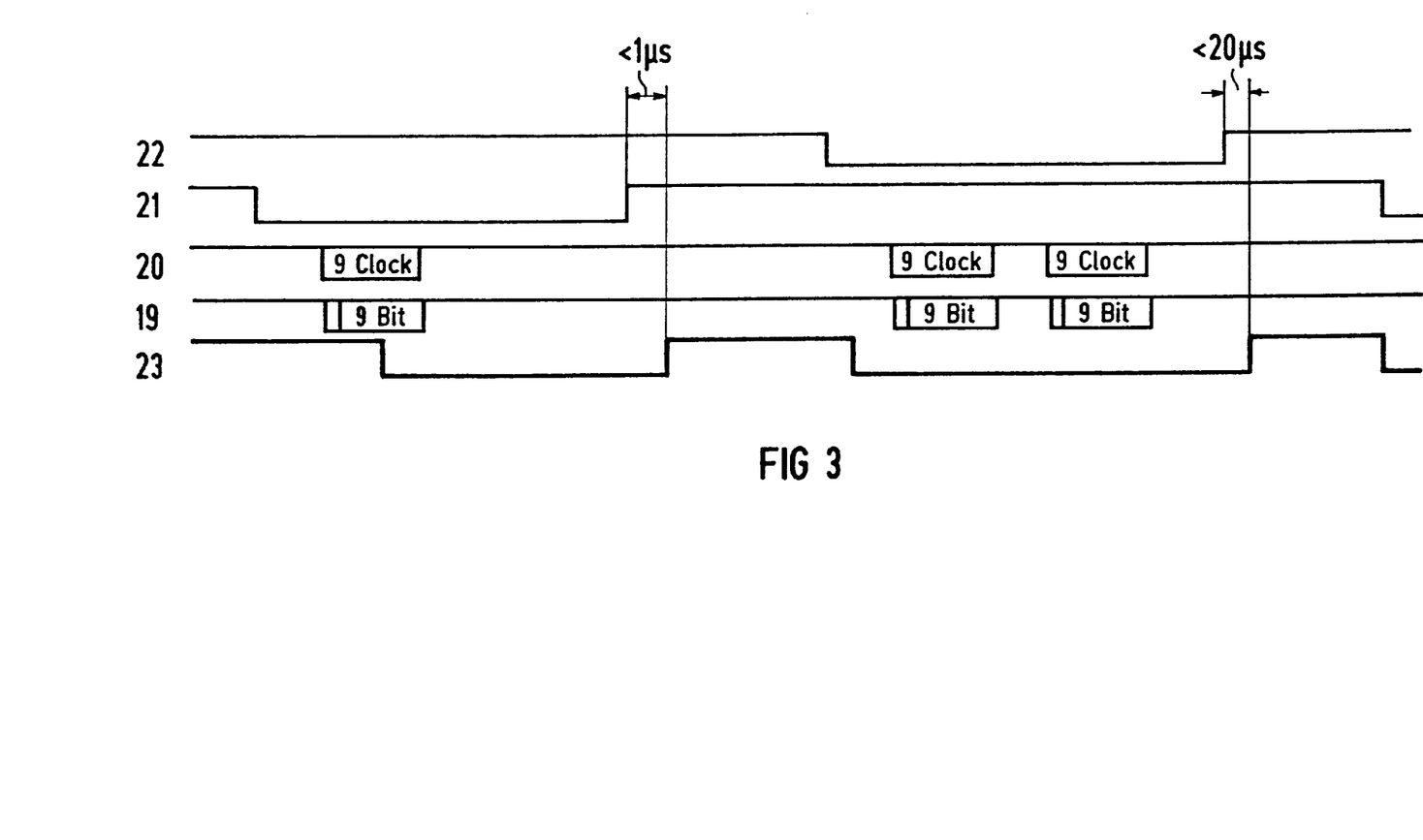
FIGS. 3 and 4 show the chronology of a data transmission in a system according to the present invention.

In response to control signals transmitted through the control lines 21, 22, the controller 24 can manipulate a switch 25 so that the bus 6 is operated either as a serial bus or as a shift register. Control of the switch 25 is as follows. A command transmission begins when the command-control line 21 goes to low, as shown in FIG. 3. and FIG. 4. When the controller 24 detects a low signal on the command-control line 21, the switches 25 are switched to their lower operating position. Furthermore, the 9-bit register 26 is clocked using the control line 27 in accordance with the clock pulse signal transmitted over the timing circuit 20. The other interface modules 3, 5 process the command transmission in the same way as the interface module 4. In this manner, given a serial data transmission, a command is simultaneously transmitted to all of the interface modules 3–5. Each command so-transmitted preferably consists of one 8-bit byte. A parity bit may be transmitted along with the byte for use by the controller 24 in detecting transmission errors.

A command transmission ends when the central processing unit 2 again transmits a high signal across the command control line 21 to the interface modules 3–5. As soon as this signal change is detected, the respective controllers 24 determine whether a transmission error exists. This determination may occur in several ways.

In a first method of fault detection, clock pulse signals transmitted on the timing circuit 20 are counted while commands are being transmitted in the controller 24. This count enables the controller 24 to determine how many bits were read into the register 26. A transmission error exists if the number of transmitted bits is not divisible by nine (an 8-bit byte plus a parity bit).

In a second method, immediately after the signal change is detected on the command control line 21, the controllers 24 read and analyze the contents of the register 26. For example, the controller 24 may check whether the transmitted parity bit has a valid value. The transmitted command may also be checked for plausibility; that is, whether the transmitted byte represents a valid command. To illustrate, 256 different bit patterns are possible for 8 bits of useful data. When, for example, only 60 different commands are defined to a system, only 60 bit patterns are considered valid. A plausibility check can thus test whether a received bit pattern conforms to one of the 60 permissible bit patterns. If it does not, a transmission error exists.

During the command transmission, the interface modules set the acknowledgement circuit 23 to low. After the command transmission ends, the interface modules 3–5 reset the acknowledgement circuit 23 to high if the command transmission was error-free; otherwise, the acknowledgement circuit 23 is kept at low. Interface module 5, as the module most remote from the central processing unit 2, applies its acknowledgement signal directly to the acknowledgement circuit 23. Interface module 4 then performs a logical and with the acknowledgement signal from interface module 5 and its own acknowledgement signal. In other words, interface module 4 only effects a high signal on the acknowledgement circuit 23 if (1) the interface module 4 receives a high signal from interface module 5, and (2) the interface module 4 itself supplies a high signal to the acknowledgement circuit 23. The same holds true for interface module 3. The central processing unit 2 therefore receives a positive acknowledgment only when all of the interface modules 3–5 have correctly received the transmitted command.

The acknowledgment from the interface modules 3–5 must be received by the central processing unit 2 within a predetermined time period. The time from when the central processing unit 2 resets the command control line 21 to high until it detects a high signal on the acknowledgement circuit 23 is thus monitored by the central processing unit 2. The central processing unit 2 interprets a successful command transmission only when the acknowledgment is received from the interface modules 3–5 within this specified time span. A suitable period might be 1 µs. Failure to timely receive the acknowledgment is interpreted as a transmission error.

A unique advantage of the present invention lies in its handling of transmission errors. To illustrate, when the central processing unit 2 fails to receive a timely acknowledgment of a command transmission, it retransmits the command to the interface modules 3–5. If this second command transmission is successful, the data corresponding to the command are then transmitted; however, should this second command transmission also fail, the command is retransmitted yet a third time. An error will be flagged and an error message generated only if this third command transmission is also faulty. The central processing unit 2 may then terminate further execution of the control program and enter a stop state. As can be seen, abnormal termination of the control program due to a "bus error" should occur quite rarely, virtually only when the bus 6 is experiencing some permanent fault condition such as the bus 6 being disconnected due to a mechanical failure.

A data transmission will generally follow a successful command transmission. Depending on the command, data may be transmitted from the central processing unit 2 to one or more of the interface modules 3–5 or, conversely, from one or more of the interface modules 3–5 to the central processing unit 2.

Looking first at a data transmission from the central processing unit 2, the central processing unit 2 initially applies a low signal to the data-control line 22, as shown in the timeline of FIG. 3. The interface modules 3–5 then manipulate their switches 25 to either switch through the data line 19 or to loop the data register 28 into the data line 19, depending on whether the respective interface module 3–5 is to receive data. When, for example, a previously-transmitted command causes data to be transmitted only to the interface module 4, the interface modules 3 and 5 short-circuit the data line briefly while the interface module 4 loops its data register 28 into the data line 19.

The data transmission itself occurs completely analogous to the command transmission described above. Thus, the central processing unit 2 transmits a clock pulse signal across the timing circuit 20 while simultaneously transmitting data on the data line 19. As soon as the central processing unit 2 again outputs a high signal on the data control line 22 to the interface modules 3–5, the interface module 4 retrieves the transmitted data. The transmitted data may comprise, for example, two 8-bit bytes, each with one additional parity bit, for a total of 18 bits.

Error analysis for data transmissions is similar to the processing described above for a command transmission; that is, the number of transmitted bits and the content of the parity bits are analyzed. In general, however, a plausibility check is not possible for data transmissions. To further increase the reliability of the data transmission, however, the test of whether the correct number of bits were transmitted may be performed not only in the receiving interface module 4, but also in the other interface modules 3, 5.

After a data transmission is complete and a high signal is reapplied to the data-control line 22, the time until the data transmission is acknowledged by the interface modules 3–5 is monitored. As with a command transmission, a data transmission is recognized as faulty if the acknowledgement does not follow within a predetermined time span of, for example, 20 µs. If the data transmission is determined to be faulty, then both the data transmission and the preceding command are retransmitted. As before, a third attempt will be made if this second data transmission also fails.

If three successive data transmissions fail, meaning the command was correctly transmitted but the corresponding data transmission was faulty, then an error will be flagged and an error message may be generated. An error handling routine may then be invoked, with the particular procedure to be followed dependent on the control program. Further execution of the control program may be terminated or the error message may be ignored. Alternatively, an internal counter can be incremented each time such an acknowledgment delay is encountered, with an error message output to the user only when the counter exceeds a predetermined limit. The counter may be reset if no further acknowledgement delays are encountered within a specified time span of, for example, 10 sec. With this approach, the user can be notified of a potential problem without having to unnecessarily disrupt processing.

Figure 4:
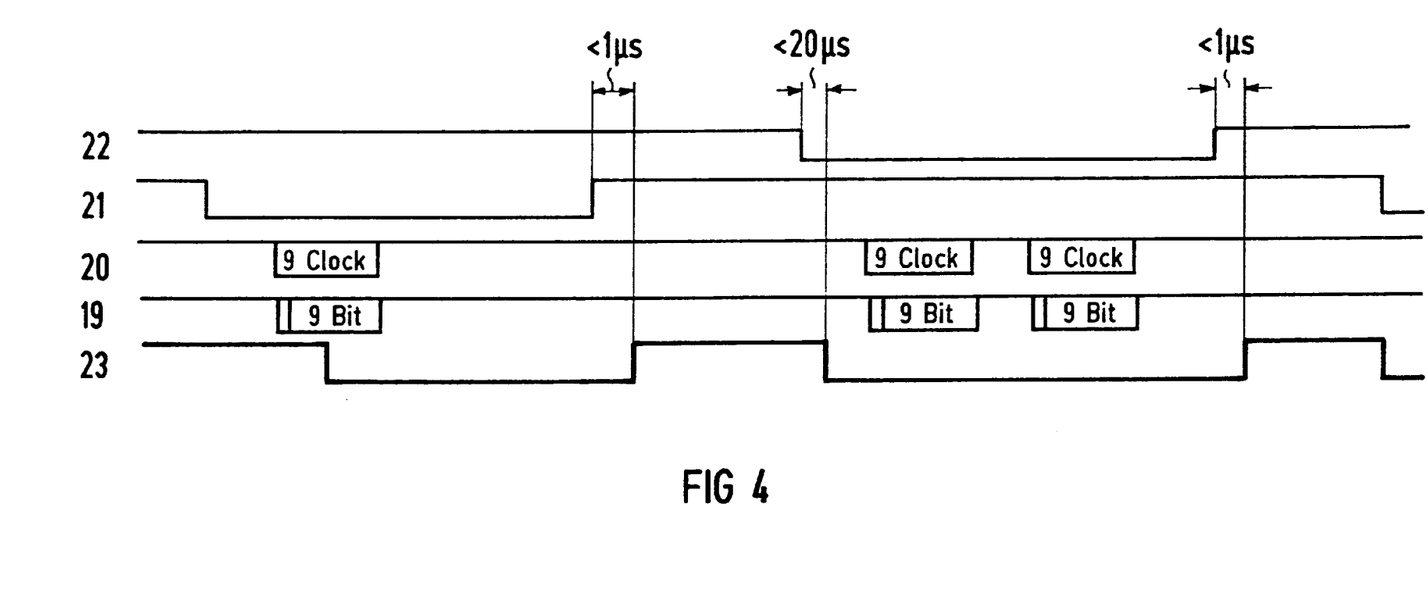

Turning now to data transmission in the other direction, FIG. 4 shows a timeline for a data transmission from the interface modules 3–5 to the central processing unit 2. The start of a data transmission is initiated when the datacontrol line 22 goes to low. When an interface module 3–5 detects this low signal, it retrieves the data to be transmitted and stores it in a register 28. As soon as the register is loaded, the interface module 3–5 sets the acknowledgement circuit 23 to low. As above, the central processing unit 2 monitors the time between when the data-control line 22 is set to low and when the central processing unit 2 detects a low signal on the acknowledgement circuit 23. Only when the acknowledgement by the interface module 3–5 is received within a predetermined period (for example, 20 µs), can the data be read from the register 28.

To read the contents of the register 28, the central processing unit 2 again transmits a clock pulse signal via the timing circuit 20. The number of transmitted clock pulses, which compares to the number of bits that are read, again is registered in the controller 24. The register 28 is thereby clocked using the control line 29 in accordance with the clock pulse signal transmitted through the timing circuit 20. In addition, a parity bit is transmitted along with each byte of useful data read from the register 28.

After the desired number of bits have been read, the central processing unit 2 again sets the data-control line 22 to high. The controller 24 of the interface module 3–5 then checks whether the number of bits read is divisible by nine. Assuming a proper number of bits is indicated, the acknowledgement circuit 23 is set to high.

As before, the central processing unit 2 monitors the time from when a high signal is applied to the data-control line 22 to when a high signal is detected on the acknowledgement circuit 23. Only when the acknowledgement is received within a delay of, for example, 1 µs, are the interface modules deemed to have reported a successful data transmission. The central processing unit 2 then validates the parity bits to determine whether a transmission error exists. As before, a plausibility check of the transmitted data is generally not possible.

The transmitted data are only accepted if all error tests run negatively; otherwise, the data transmission is determined to be faulty. If a transmission is faulty then, analogous to the data transmission to the interface modules 3–5 described above, the command immediately preceding the data transmission is repeated and another attempt is made to read the data from the interface module 3–5. The criterion for an abnormal termination and an error message may be identical to those described above for transmitting data to the interface modules 3–5.

Figure 5:
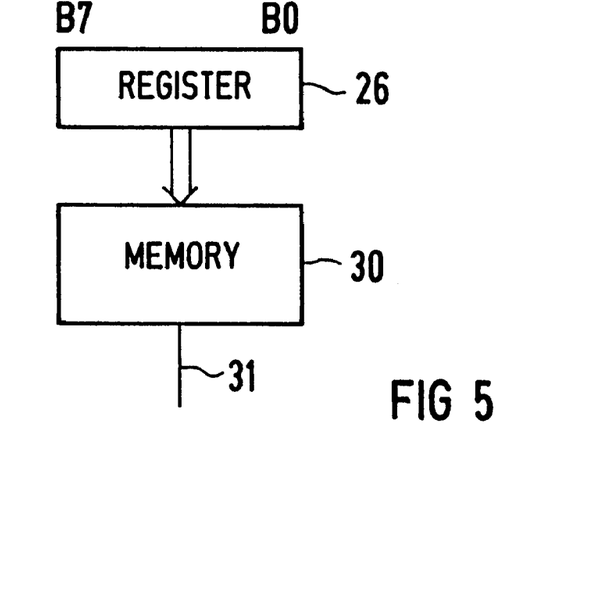
FIGS. 5–7 illustrate methods of data validity checking for use with the present invention.

FIG. 5 illustrates how the plausibility of commands transmitted to the interface modules 3–5 may be validated. The 8 bits B7 through B0 of useful information transmitted (that is, the actual command without the parity bit) are used as an address to access a memory device 30. The memory device 30 may be preconfigured with 256 memory locations, each of which identifies a bit that is set to 1 or 0 depending on whether the address corresponds to a valid command. Using the applied address, one of these bits is selected and output via line 31. If this bit has a zero value, then the received bit pattern does not correspond to a valid command.

Figure 6:
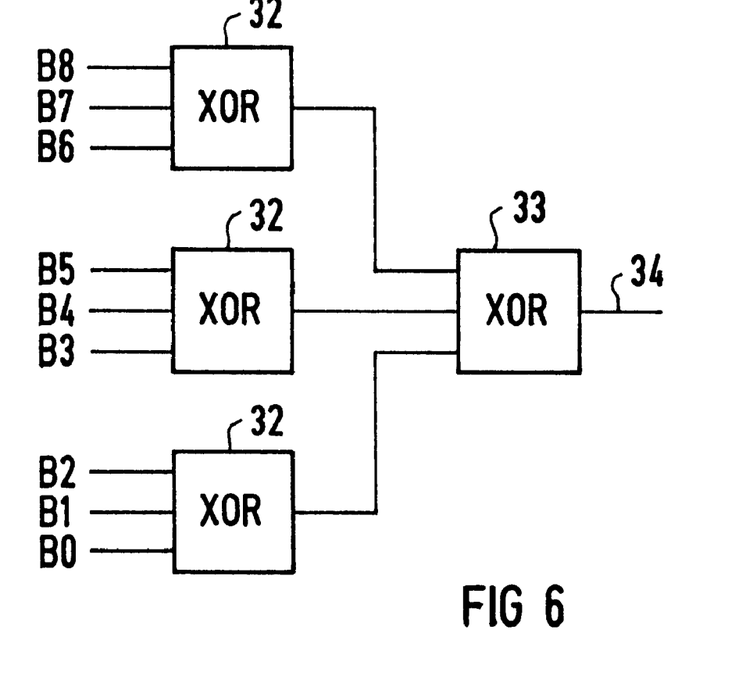

FIG. 6 illustrates how a data transmission consisting of 8 bits of useful data B7 through B0 and a parity bit B8 may be checked for transmission errors.

The bits B0 through B8 are combined into groups of three, and each group of three is fed to a respective XOR circuit 32. The output signals from these circuits are then supplied to another XOR circuit 33. A transmission error is indicated by a result with odd parity; that is, when the output signal from the XOR circuit 33 equals zero. This output signal is then posted to line 34.

Figure 7:
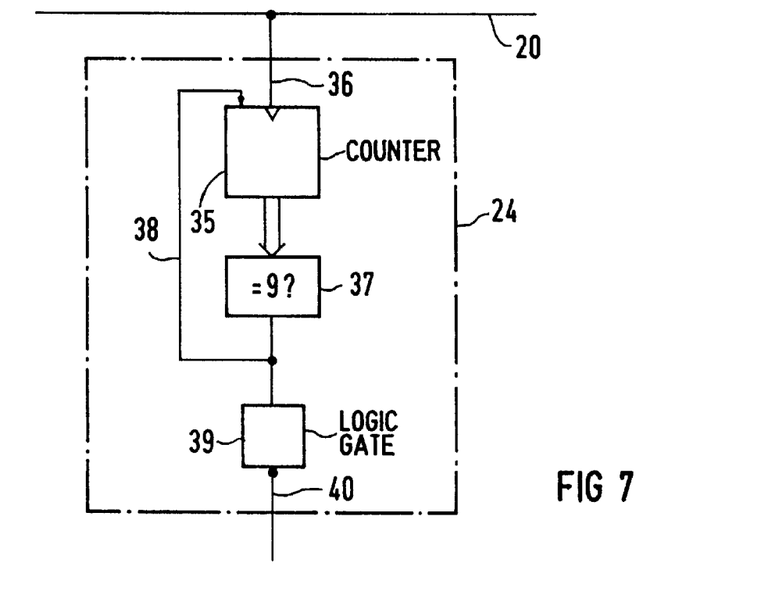

Referring now to FIG. 7, the number of bits transmitted can easily be determined using a counter 35 connected through line 36 to the timing circuit 20. The output signal from the counter 35 is continuously fed to a comparator 37 which checks whether the content of the counter 35 is divisible by nine. If it is, the counter 35 is reset to zero using the control line 38. The output signal from the comparator 37 is also fed to an inverter 39 for signal inversion. In a valid data transmission, the output signal from the inverter 39 should be one at the end of the transmission. The output signal from the inverter 39 is then output on line 40.

Figure 8:
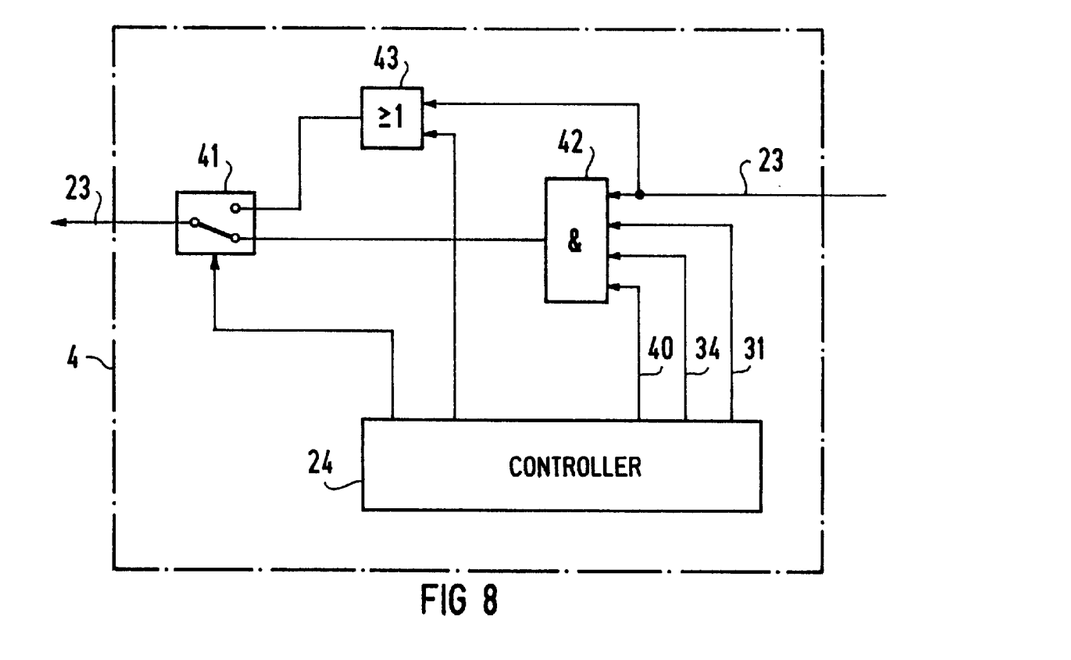
FIG. 8 is a block diagram of a circuit arrangement for transmitting an acknowledgment signal to a controller.

As shown in FIG. 8, an interface module 4 may have a circuit 41, an AND-gate 42, and an OR-gate 43 for acknowledging receipt of signals using the acknowledgement circuit 23. The switch 41 is normally in the lower operating position, as shown in FIG. 8, so that the AND-gate 42 is looped into the acknowledgement circuit 23. Lines 31, 34 and 40 are connected on the input side to the AND-gate 42. Therefore, as a rule, the acknowledgement circuit 23 is set by the output signal from the gate 42 to high when high signals are supplied to the gate 42 through the acknowledgement circuit 23 and the lines 31, 34, and 40. The switch 41 is only set to the upper operating position when a command for reading data out of the interface module 4 has been received and the data-control line 22 goes to low. In this case, the acknowledgement circuit 23 must be kept at high by the OR-gate 43, even when only one of the interface modules 3 through 5 does not react within 20 μs.

In the above-described processing, after three successive faulty data transmissions, an error message "bus error" or "acknowledgement delay" may be displayed to an operator. It is of course possible for a different number of repetitions to be specified. Likewise, the number of repetitions could be parameterized for increased flexibility.

While the present invention has been described with reference to specific embodiments, it will be apparent to those skilled in the art that many modifications and variations are possible. Accordingly, the present invention embraces all alternatives, modifications and variations that fall within the spirit and scope of the appended claims, as well as all equivalents thereof.

What is claimed:

1. A method for transmitting information across a bus assigned to a programmable controller executing a control program, wherein the bus connects a main unit to a secondary unit of the programmable controller, said method comprising the steps of:

(a) determining whether a transmission is faulty;

(b) repeating a transmission when a faulty transmission is determined; and (c) generating an error message and terminating the control program when a predetermined number of successive faulty transmissions are determined.

2. The method of claim 1, wherein the bus is capable of transmitting both commands and data, said step of generating an error message comprising generating an error message specific to a type of information transmitted.

3. The method of claim 1, wherein said step of determining whether a transmission is faulty comprises determining whether a portion of the transmission includes plausible information.

4. The method of claim 1, wherein the transmission includes a substantive portion and a test portion, said step of determining whether a transmission is faulty comprising determining whether the test portion is valid.

5. The method of claim 1, wherein said step of determining whether a transmission is faulty comprises determining whether the secondary unit acknowledges an error-free reception of the transmission within a predetermined period after the main unit completes the transmission.

6. The method of claim 1, wherein said step of determining whether a transmission is faulty comprises determining whether the secondary unit acknowledges an error-free transmission to the main unit within a predetermined period after the secondary unit completes transmitting information to the main unit.

7. The method of claim 1, wherein the bus is a serial bus and a valid transmission consists of an integral multiple of a fixed number of bits, said step of determining whether a transmission is faulty comprising determining whether a number of bits received deviates from an integral multiple of the fixed number of bits.

8. The method of claim 1, wherein the electrical controller comprises a programmable controller.

9. A programmable controller, comprising a main unit, a secondary unit, a control program, a bus through which said main unit and said secondary unit are able to exchange information, wherein both said main unit and said secondary unit include means for analyzing a transmission to identify a transmission error and a means for terminating execution of said control program in response to said identification.

10. The programmable controller of claim 9, wherein said secondary unit further comprises means for determining whether a predetermined portion of the transmission includes plausible information.

11. The programmable controller of claim 9, wherein each of said main unit and said secondary unit further comprise means for evaluating a predetermined test portion of the transmission.

12. The programmable controller of claim 11, wherein said secondary unit further comprises means for acknowledging an error-free transmission.

13. The programmable controller of claim 9, wherein said bus comprises a serial bus, and said main unit and said secondary unit further comprise means for determining a number of bits in a transmission.

\* \* \* \* \*